J. J. BERRIGAN.
APPARATUS FOR EXPRESSING LIQUIDS FROM SOLIDS.
APPLICATION FILED AUG. 22, 1911.
1,130,701.
Patented Mar. 9, 1915.
3 SHEETS—SHEET 3.
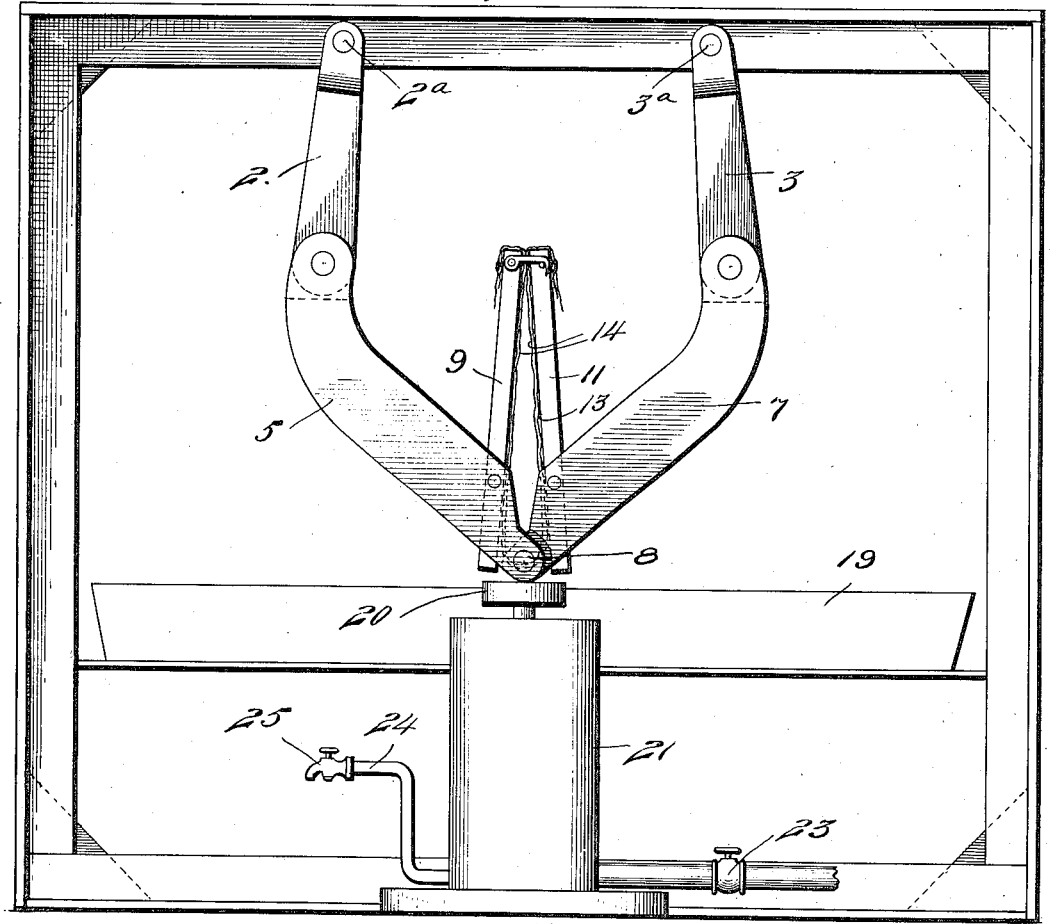
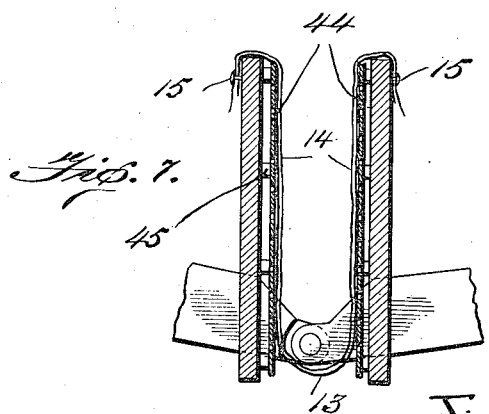

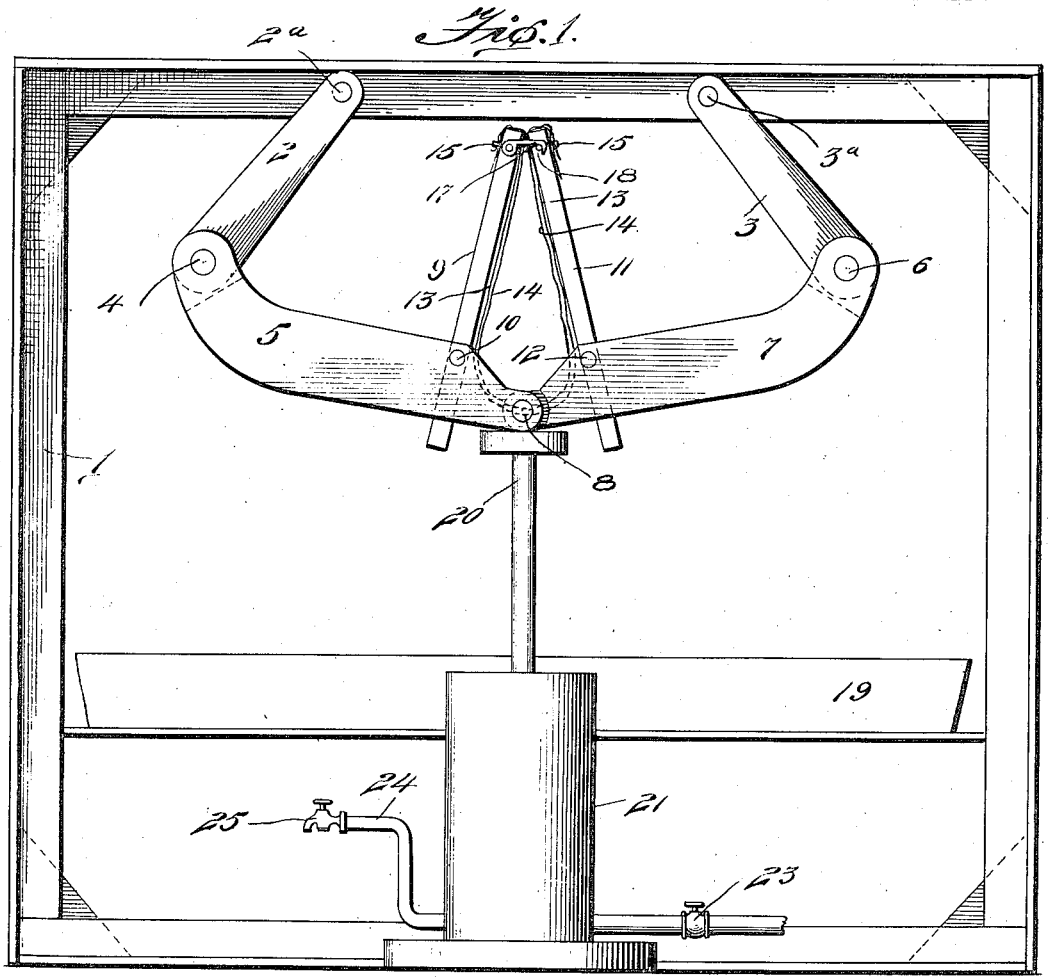

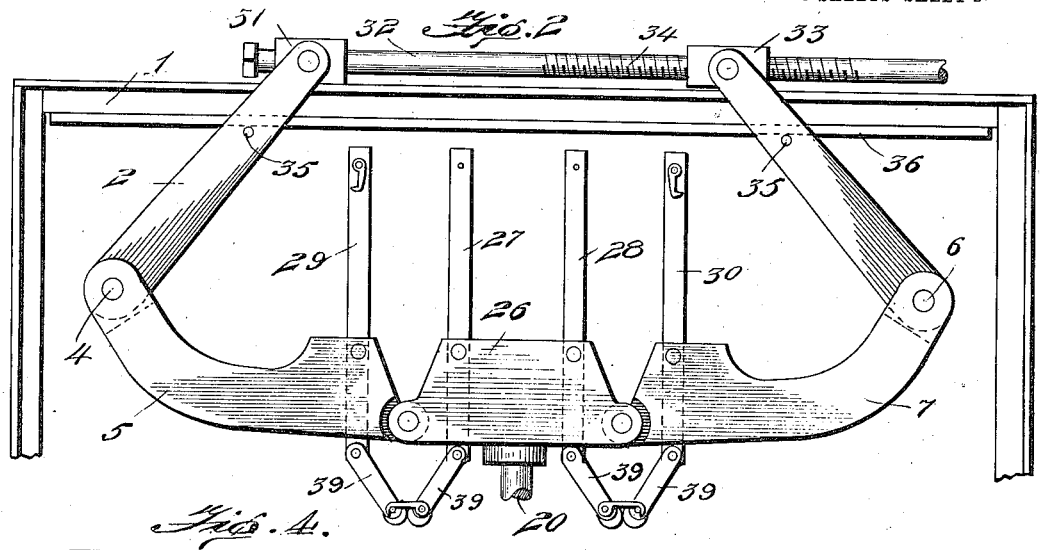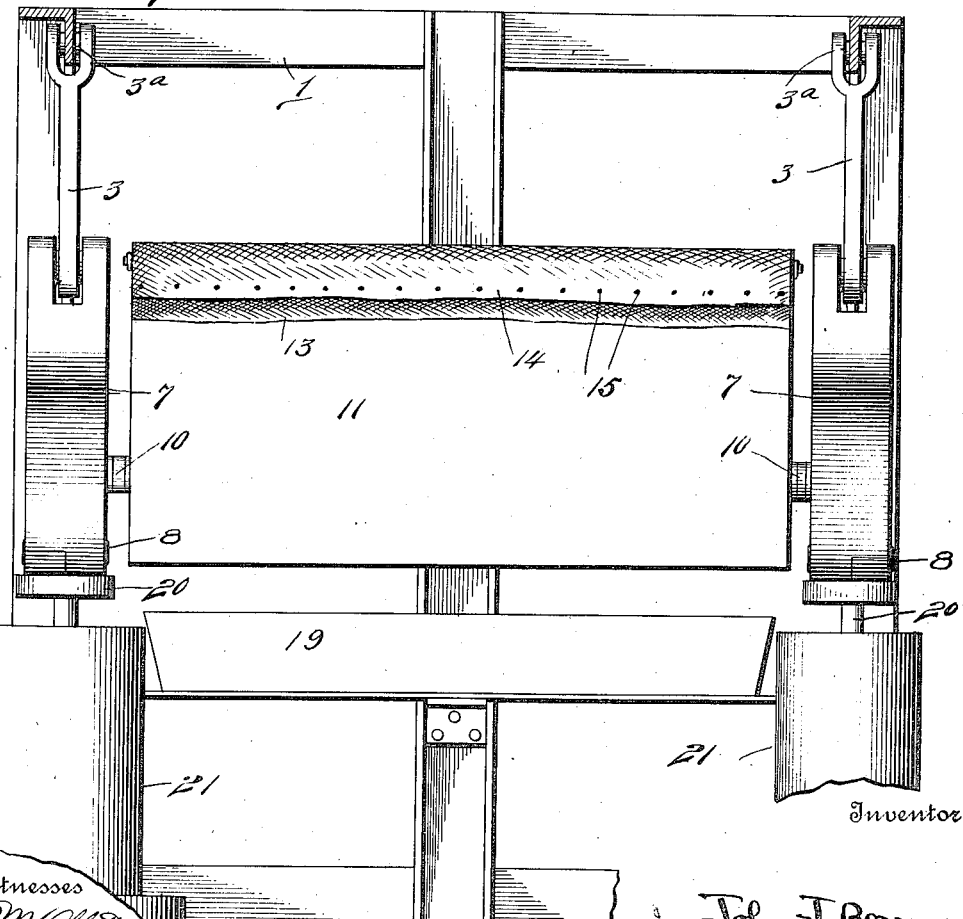

UNITED STATES PATENT OFFICE.

JOHN J. BERRIGAN, OF ORANGE, NEW JERSEY, ASSIGNOR TO HENRY R. WORTHINGTON, A CORPORATION OF NEW JERSEY.

APPARATUS FOR EXPRESSING LIQUIDS FROM SOLIDS.

1,130,701.

Specification of Letters Patent. Patented Mar. 9, 1915.

Application filed August 22, 1911. Serial No. 645,407.

*To all whom it may concern:*

Be it known that I, JOHN J. BERRIGAN, a citizen of the United States, residing at Orange, in the county of Essex and State of New Jersey, have invented certain new and useful Improvements in Apparatus for Expressing Liquids from Solids, of which the following is a specification.

This invention relates to improvements in apparatus for expressing liquids from solids.

The separation of solids from liquids in certain classes of materials resulting from commercial manufacturing operations is often a matter of extreme difficulty. The waste liquors from the manufacture of starch, containing more or less gluten in excessively finely divided condition, are typical of the classes of material just referred to, as are also the slops from "beer stills," cane juice, etc. Great difficulty has been encountered heretofore in the filtration of such liquids. Of course, such filtration can be done in a laboratory way on a small scale, but, so far as I am aware, it has been difficult—if not impossible—to filter certain liquids of the type mentioned, in an economical manner, on a scale sufficiently large to permit of its being carried out in commercial practice.

When working with the difficultly filtrable liquids, of the type hereinbefore pointed out, by ordinary methods, it has been found that the almost impalpably fine solids tend to clog the ordinary filtering cloths and thereby prevent the passage of liquid through the same. If pressure is applied to hasten the flow of liquid, much of the fine solids pass through a filter cloth even of the finest kind with comparative ease, there being little or no separation of solids from the liquid.

I have discovered that if, instead of trying to filter such mixtures of liquid and finely divided solids directly through a very fine cloth, a somewhat coarser cloth be interposed between the material to be expressed and the fine cloth, and the material be then subjected to pressure, there is substantially no tendency for the finely divided solids to pass through such a plurality of filtering media. With this arrangement of filtering media, upon the application of pressure in a reasonable amount, the liquid can be expressed from the solids and will pass through the filtering media without clogging the same. Furthermore, the liquid under such suitable pressure passes through the filtering media at a sufficiently rapid rate for commercial operation while at the same time being practically free from the solids. I am not able to state why an apparatus embodying this arrangement of filter cloths and proper means for applying pressure thereto should give such clean separation of solids and liquids when working on slimes and similar materials of the type hereinbefore referred to, which were considered almost impossible to handle by ordinary expressing methods. Whatever may be the theoretical explanation of process, it has been found by repeated practical tests that it does produce the results described, and I content myself with noting the observed facts without attempting to explain them.

It is the object of the present invention to provide a pressing apparatus particularly adapted for taking advantage of the discovery made by me as hereinbefore pointed out and, with this object in view, an apparatus embodying my invention comprises the features, details of construction and combination of parts which will first be described in connection with the accompanying drawings and then more particularly pointed out.

The apparatus herein disclosed avoids the defects inherent in presses hitherto proposed for employment in connection with materials such as I have mentioned, and provides means for applying pressure in a gradual and regulable manner whereby liquids may be expressed from slimes and the like with great efficiency, while at the same time, the liquid expressed is substantially free of finely divided solids. In a typical embodiment of the invention, the apparatus comprises a pair of press plates, which are advantageously of metal and relatively massive and heavy, arranged in the form of an inverted V with their upper edges adjustably hinged, latched, or otherwise pivotally secured together to form a press chamber suitable to inclose filtering material such as a filter bag or the like. The press chamber thus formed is so mounted as to be capable of a general up and down movement. Members, such as levers, carried on a supporting frame work, and best connected to each other, engage the press plates in such manner that upon descent of the press chamber as a whole, these members operate to force the press plates toward each other, thereby reducing the angle between the plates and exerting pressure on materials placed between them. The descent of the press chamber may be wholly gravital, the great weight of the press plates which I prefer to employ serving to operate the levers engaging the plates. Supplemental pressure may be applied to give a final squeeze where desirable.

I have also discovered that where slimes, etc., are to be inclosed in filter cloths and pressed between plates, a special arrangement of the filtering material gives particularly advantageous results. I may employ, for example, a plurality of superimposed cloth bags to inclose the liquid-containing material, the texture of the cloth being different in the different bags. Contrary to the usual practice, I arrange these bags so that the coarsest textured cloth is next the material to be pressed, while the finest cloth is on the outside and is next the pressing plates. Such a reversed arrangement of the filter cloths I have found to give a better and more complete separation of liquids from finely divided solids than has hitherto been deemed possible.

In the accompanying drawings I have shown more or less diagrammatically certain assemblages of apparatus elements embodying the present invention. In this showing, Figure 1 is an end elevation of a press unit, comprising a single pair of pressing members, ready for the application of pressure; Fig. 2 is an end elevation of a modified type of press units comprising two pairs of pressing members, the units being shown in filling position; Fig. 3 is an end elevation of the apparatus of Fig. 1 in pressing phase; Fig. 4 is a side elevation of the showing of Fig. 3; Figs. 5, 6 and 7 are detail modifications partly in section and partly in elevation.

Referring to Figs. 1, 3 and 4 of the drawings, 1 is a framework supporting the press units, of which there may be one as shown, or a plurality. Suspending arms or links 2 and 3 are pivoted at 2ᵃ and 3ᵃ to the framework. Arms 2 are pivotally joined at 4 to members 5, while arms 3 are similarly connected at 6 to members 7, the members or lever arms 5 and 7 being pivotally joined as at 8. Press member 9 is pivotally mounted at 10 on members 5, coöperating press element 11 being similarly mounted at 12 on members 7. These press elements are best of considerable weight and are most conveniently solid iron castings. The mounting for the press plates thus comprises a plurality of compound levers, each such lever consisting of pivotally united sections, and being pivotally connected to a side end of a press plate and pivotally supported by the framework of the press. A pair of such swinging arms may be thus arranged at each of two opposite ends of the press plates with the members of each pair pivotally connected as indicated at 8. This arrangement is, in a way, like a toggle; and is a particularly advantageous embodiment of my invention.

Fine mesh filter cloth 13 next the working faces of the press plates and cloth 14 of somewhat coarser texture form a double filtering bag, the upper edges of the cloths being removably secured by pins or hooks 15 at the back and toward the upper edges of the press plates.

Hooks 17 on one of the press elements engaging pins 18 on the other element serve as latches to hold the upper edges of the press elements together and form a V-shaped pressing chamber. 19 is a drip pan to collect expressed liquid. The press unit is held out of pressing phase against the force of gravity by means of movable supporting members such as hydraulic rams 20 arranged at each end of the transversely extending unit. The ram chamber 21 is provided with an inlet pipe 22 having a check valve 23, and is also furnished with an outlet pipe 24 having a faucet or drip cock 25 for regulating the outflow of liquid from the ram chamber. Each pair of ram chambers may be connected with an equalizing pipe if desired.

In the modification shown in Fig. 2, in which the filter cloths are omitted, two pairs of press elements are mounted together in one unit. Members 5 and 7 instead of being pivoted together directly are connected by a linking member 26 carrying pivotally mounted press plates 27 and 28 coöperating with plates 29 and 30 respectively. Arm 2 is pivotally held by collar bearing 31 on shaft 32 suitably mounted on the press frame; while arm 3 is pivotally secured to threaded collar 33 engaging threads 34 on the shaft. Pins 35 bearing against plate 36 limit the upward movement of the suspending arms. The purpose of this arrangement will be later referred to.

As indicated in Figs. 5 and 6, it is convenient to provide the coöperating press elements or plates near their upper edges with sealing means such as abutting strips 37 and 38 which may be of rubber and steel respectively, or both strips may be of rubber. In Fig. 5 the pinch of the press chamber is small, but where a wider pinch is desired, either of the sealing strips may be enlarged to any desired extent as shown in Fig. 6.

If desired the opening between the lower edges of the press plates may be closed as shown in Fig. 5 by sealing plates 39 pivoted at the ends of their upper edges to the press plates as at 40 and pivotally secured together at the ends of their lower edges by latches or other fastening means, not shown.

Sealing strips 41 are also best provided and these may be both of rubber, for example, or either may be of metal. The sealing plates serve to prevent outward bulging of the press cakes under pressure. With the lower part of the press chamber thus sealed, the outer or fine filter cloth may simply be placed against the press and sealing plates as shown instead of being made into bag form. And indeed, where the press chamber is not sealed below, it is not essential that the outer cloth be a bag, though it is usually advisable to so form it. With the supporting bottom seal, it is of course possible to dispense with any special means for fastening the inner coarse cloth to the press plates. By unlatching the sealing plates at their lower edges and opening up the press chamber, the coarse cloth containing the press cake drops out freely. Or, and perhaps most conveniently, where the broad end of the press chamber is covered by sealing plates, neither the fine nor the coarse cloth need be in bag form, but each may be in separate sections with their upper and lower margins held between sealing strips 37 and 41 respectively and extending therebeyond a convenient distance and secured to the plates by pins or other fastening means if desired. When the edges of the sealing plates are separated, the press cake drops out, leaving both the fine and coarse cloths suspended by their upper margins.

For some kinds of work it is convenient to provide means for filling the press chamber without opening it at the top. Thus one or more pipes 41$^a$ valved at 42 may enter the chamber and project through alined openings in the filter cloths, gasketing means 43 being best provided to prevent leakage of solids around these openings. After a compression, the press chamber may be elevated to spread the press plates apart, more wet material may be forced into the chamber through 41$^a$ and pressure again applied. It is usually desirable to score the working faces of the press plates with grooves to permit free passage of liquid over the pressing surfaces. Or, and very conveniently, perforated false faces, or screens 44 (Fig. 7) spaced away from the plates as by spacing members 45 may be employed in lieu of the grooving.

Suitable means may also be provided advantageously to close or seal the ends of the press chamber, as well as the top and bottom, and thus prevent lateral squeezing out of the press cake. Such means may be of any desired type, but very conveniently take the form of collapsible end walls or diaphragms 46 (Fig. 6), similar to the end closures disclosed in my copending applications Serial Nos. 629,433 and 629,434, filed May 25, 1911 (now Patents Nos. 1,018,957 and 1,018,958 of February 27, 1912). These end seals or walls may be constructed of leaves or strips of sheet metal adapted to slide over one another as the press walls approximate or separate; or they may be made of stout cloth, reinforced or not with metal, and arranged to fold up like a bellows.

The operation of the apparatus will be readily understood from the foregoing description.

The press unit or units being held up in filling position, each press chamber is opened as shown in Fig. 2, and the filter cloths arranged as already described; the finer cloth being advantageously next the working face of each plate. For many kinds of material, only one cloth may of course be required; but where the press is being used to carry out the process hereinbefore described, cloths of different fineness are as a rule essential. The material to be expressed is then placed in the bag formed by the filter cloth or cloths and the upper edges of the plates are brought together and held in place by the latches. Where lower sealing plates are used, these are of course latched together before pressure is applied. Faucets 25 are now opened to permit a regulated flow of water from the ram chambers, the rapidity of this flow depending entirely upon the speed with which it is desired to apply the pressure. The flow may be restricted to a certain number of drops per minute, or it may be in a continuous stream of any convenient volume. For gluten and grape juice slimes, a very slow flow is best. The press elements or plates being very heavy as a rule, the press unit sinks as the liquid in the ram chamber flows out, arms 5 and 7 forming a progressively smaller angle during the descent and the lower edges of the press plates being thereby forced toward each other into pressing relation. In the apparatus of Fig. 2, the member 26 maintains a substantially horizontal position during this operation. With either form of the apparatus a regulated gravital descent of the press members is thus obtainable, which may be as gradual as desired. The greatest pressure occurs of course at the pinch, near the point where the plates are locked together; and the pressure gradually diminishes over the plate surfaces toward the lower edges. The final position of a press unit is shown in Fig. 4 where the ram has descended to about its lowest point. The ram head may of course be connected to the press unit in such a manner as to exert a positive downward pull after the unit has descended as far as it will by gravity, thus giving a final squeeze to the material in the press bag. Or pressure may be applied inwardly from each side at 4 and 6 causing the jointed framework to give an increased toggle effect and force the press plates together. Still another mode of applying the final positive pressure is illustrated in Fig. 2. By rotating the shaft in the proper direction, the threaded collar or nut 33 may be caused to move along the shaft toward collar 31, thus causing arm 3 to exert a pull on member 7 which acts like a lever to force the press plates closer together. After the material has been pressed to the desired extent, the press unit is raised to its original position, with members 5 and 7 (Fig. 1) or 5, 26 and 7 (Fig. 2) in a horizontal or convexed position, the press plates spreading apart and the press chamber opening up. The securing latches are then unhooked, allowing the upper edges of the press plates to be spread apart, and the cloths to be removed from their fastenings and dropped together with the press cake out of the press. Fresh cloths may then be fastened in place, and a fresh load of material placed in the unit. The press cakes are separated from the cloths very readily, and the cloths are easily cleansed. Upon raising the press units after a pressing phase and releasing the pressure on the press cake, the expansion of the compressed cake tends to draw air inwardly through the cloths, thus opening up the meshes of the fabric. The cake also tends to break up and become more or less comminuted. It is possible therefore, and, as before stated, often convenient, not to dump the press cake after each pressing phase, but simply to add more of the wet material to the chamber containing the expressed cake and repeat the pressing. This may be repeated until the press cake becomes inconveniently large.

As many press units may be mounted on a single frame as convenience requires. And the pressure due to gravity may be supplemented, as before stated, by additional pressure applied at various points of the apparatus. As a rule however the pressure due to the dead weight of the heavy press plates is ample for the present purposes, and particularly in separating slimes. Other means than hydraulic rams may of course be used to lift the units into filling position. The press cake resulting from the pressing operation hereinbefore described either with or without the inclosing filter cloth may be further pressed if necessary in any convenient type of press, most advantageously in one having transverse press bars of the type described in my copending applications above mentioned and also in Patent 994,632.

What I claim is:—

1. In a press, a press unit comprising coöperating press members, a plurality of filtering media of different degrees of fineness arranged between said members, the finest of said filtering media being disposed next the working faces of said press members, and means for forcing one of said plates toward the other.

2. In a press, a press unit comprising a pair of coöperating press plates, coarse and fine filter cloths disposed between said plates, the coarse cloth being arranged to contact directly with material to be pressed and to separate the fine cloth from contact with such material, and means for forcing said press plates toward each other.

3. In a press, a press element comprising a pair of press plates pivotally joined along adjacent edges to form a V-shaped chamber, and sealing plates covering the broad end of said chamber, said sealing plates being pivotally connected to said pressure plates and to each other.

4. Apparatus for expressing liquids from solids, comprising a supporting framework, pivotally connected members supported by said framework, and coöperating press members pivoted upon certain of said connected members and arranged to be brought into and out of pressing relation by the movement of said connecting members.

5. Apparatus for expressing liquids from solids, comprising a supporting framework, pivotally connected members supported by said framework, and a V-shaped press chamber having movable walls pivotally mounted upon a pair of said connected members, said connected members being arranged to act as lever arms to approximate the walls of said press chamber and to produce lateral pressure on material contained therein.

6. Apparatus for expressing liquids from solids, comprising a supporting framework, links pivoted on said framework, lever arms pivotally connected to each other and to said links, and a pair of coöperating press plates forming a V-shaped press chamber pivotally mounted on said lever arms, said lever arms being arranged to descend gravitally and to force said press plates into pressing relation.

7. Apparatus for expressing liquids from solids, comprising flexibly connected supporting members, and coöperating press members pivoted on certain of said supporting members and forming a press chamber having movable walls, said press chamber being so mounted upon said supporting members as to be bodily movable in a substantially vertical plane with lateral approximation of said walls.

8. Apparatus for expressing liquids from solids, comprising a supporting frame, flexibly linked supporting members depending from said frame, and a press chamber having movable walls supported by said linked supporting members, said supporting members being arranged to raise said press chamber bodily and to cause mutual recession of the chamber walls, or to lower said chamber and to cause mutual approximation of said walls.

9. Apparatus for expressing liquids from solids, comprising a supporting frame, flexibly linked supporting members depending from said frame, a relatively heavy and vertically movable press chamber having movable walls connected to certain of said linked supporting members, and means for supporting said press chamber in raised position and for permitting regulated gravital descent of the same.

10. In a press, a press unit comprising a pair of plates pivotally joined together with a pair of edges adjacent to form a V-shaped chamber, sealing plates arranged to cover the broad end of said chamber, said sealing plates being pivotally connected to said press plates and to each other, and means for feeding material to be pressed to the press chamber thus covered.

11. A press comprising a pair of coöperating substantially vertical press plates, a mounting therefor comprising a plurality of pivotally supported swinging members pivotally united to opposite ends of said plates, each of said swinging members comprising pivotally united sections, and means for raising and lowering the assemblage of plates and swinging members to vary the distance between such plates.

12. A press comprising a pair of coöperating substantially vertical press plates, a mounting therefor comprising a plurality of pivotally supported swinging members pivotally united to opposite ends of said plates, each of said swinging members comprising two pivotally united sections, means for raising and lowering the assemblage of plates and members, to vary the distance between such plates and a filter device between such plates.

13. A press comprising a pair of coöperating substantially vertical press plates, a mounting therefor comprising a plurality of pivotally supported swinging members pivotally united in pairs to each other and to opposite ends of said plates, each of said swinging members comprising two pivotally united sections, means for raising and lowering the assemblage of plates and members to vary the distance between such plates and a bag filter between such plates.

14. A press comprising a pair of coöperating substantially vertical press plates, a mounting therefor comprising pivotally supported swinging means pivotally united to opposite ends of said plates, said swinging means comprising pivotally united sections, and hydraulic means for raising and lowering the assemblage of plates and swinging means to vary the distance between such plates.

15. Apparatus for expressing liquids from solids comprising a pair of coöperating press plates in substantially vertical arrangement and provided with means for pivotally connecting their upper edges, and flexible supporting means for said plates permitting the same to move upwardly and downwardly, the connection of the supporting means to said plates being such that when the plates move downwardly the lower edges of the plates mutually approach, and when the plates move upwardly said edges mutually recede.

16. In a pressing apparatus, the combination, with coöperating pressing members mounted for gravital movement downward, and means for causing the downward movement of the pressing members to bring said members closer together, of controllable power means arranged to check the downward movement of the pressing members.

17. In a pressing apparatus, the combination, with coöperating pressing members mounted for gravital movement downward and having their pressing faces in planes extending in a general upward direction, and means for causing the downward movement of said pressing members to bring them closer together, of controllable power means for checking said downward movement.

18. In a pressing apparatus, the combination, with coöperating pressing members arranged side by side and gravitally movable downward, and means for connecting said pressing members for angular movement relative to each other, of power means for moving said pressing members upward, and mechanism arranged to move said pressing members angularly toward each other during their downward movement, and to separate them during their upward movement.

19. In a pressing apparatus, the combination, with a pair of coöperating pressing members mounted for movement downward under the action of a vertical force, said members having pressing faces extending in a general upward direction, and means for pivotally connecting said pressing members together, of means for causing the downward movement of the pressing members to produce an angular movement of said pressing members about their pivotal connection and toward each other.

20. In a pressing apparatus, the combination, with a pair of coöperating pressing members mounted for ascending and descending movements bodily, and means for pivotally connecting said members together, of means for causing the ascending and descending movements of the pressing members to produce angular movements of said pressing members, about their pivotal connection, from and toward each other respectively.

21. In a pressing apparatus, the combination, with a pair of coöperating pressing members, and means for connecting said pressing members for angular movements relative to each other, of fulcrumed supporting devices arranged to permit the rise and fall of said pressing members and to produce corresponding angular movements of said pressing members from and toward each other respectively, whereby the downward movement of the members under the action of gravity produces pressure on the pressing members to move them angularly toward each other.

22. In a pressing apparatus, the combination, with a pair of coöperating pressing members having their pressing faces in planes extending in a general upward direction, said members being mounted for gravital movement downward, means for connecting said pressing members for angular movement relative to each other, and means for causing the downward movement of said members to produce an angular movement of the members toward each other, of a device bridging the space between the pressing members and forming a support for material between said pressing members.

23. In a pressing apparatus, the combination, with a pair of coöperating pressing members whose pressing faces lie in planes extending in a general upward direction, means for connecting said pressing members for angular movement relative to each other, and means for moving said pressing members toward and from each other angularly, of a collapsible sealing device connected to each pressing member and arranged to support material between the pressing faces.

24. In a pressing apparatus, the combination, with a pair of coöperating pressing members whose pressing faces lie in planes extending in a general upward direction, means for connecting said pressing members for angular movement relative to each other, and means for moving said pressing members toward and from each other, angularly, of collapsible sealing devices at the sides of said pressing members and connected thereto.

25. In an apparatus for expressing liquids from solids, the combination, with coöperating pressing members, of filtering media arranged to inclose the material to be pressed and located between said pressing members, said filtering media comprising a plurality of fabrics of different degrees of fineness, arranged one inside another, the exterior fabric being finer than the interior fabric and means for forcing said pressing members toward each other.

26. In an apparatus for expressing liquids from solids, the combination, with coöperating pressing members, of filtering media arranged to inclose the material to be pressed and located between said pressing members, said filtering media comprising a plurality of fabrics of different degrees of fineness, arranged one inside another, the exterior fabric being finer than the interior fabric and means for actuating said pressing members to subject the material to pressure greater toward one end than toward the other end of the pressing members.

27. In an apparatus for expressing liquids from solids, the combination, with a pair of coöperating pressing members, means for pivotally connecting them together in a manner to permit an angular movement of said pressing members toward and from each other, and means for pressing said members toward each other, of filtering media located between said pressing members and arranged to inclose the material to be pressed, said filtering media comprising a plurality of fabrics of different degrees of fineness, arranged one inside another, the exterior fabric being finer than the interior fabric.

28. In an apparatus for expressing liquids from solids, the combination, with a pair of coöperating members having their pressing faces in planes extending in upward directions, said members being mounted for gravital movement downward, and means for causing said downward movement to force the members toward each other yieldingly, of filtering media located between said pressing members and arranged to inclose the material to be pressed, said filtering media comprising a plurality of fabrics of different degrees of fineness arranged one inside another, the exterior fabric being finer than the interior fabric.

In testimony whereof, I affix my signature in the presence of two subscribing witnesses.

JOHN J. BERRIGAN.

Witnesses:
BENJAMIN H. WILLIAMS,
JOHN H. TRENT.